United States Patent

[11] 3,591,075

| [72] | Inventor | Yukio Onishi<br>18,3, 1-chome Nakamachi Hoyashi, Tokyo, Japan |
|---|---|---|
| [21] | Appl. No. | 838,935 |
| [22] | Filed | July 3, 1969 |
| [45] | Patented | July 6, 1971 |

[54] THERMOSTAT FOR ENGINE COOLING WATER
1 Claim, 5 Drawing Figs.

[52] U.S. Cl.................................................. 236/34,
236/100, 73/368.3
[51] Int. Cl................................................... F01p 7/16
[50] Field of Search........................................ 236/34,
34.5, 100

[56] References Cited
UNITED STATES PATENTS
2,906,123 9/1959 Vernet et al................. 236/100 X
2,981,475 4/1961 Salmon........................ 236/34
3,395,580 4/1968 Kuze............................ 236/100 X Primary Examiner—Edward J. Michael
Attorney—Linton & Linton ABSTRACT: The present invention is concerned with an improvement in thermostats to be installed between the water manifold and the radiator in the cooling system of a water-cooled internal combustion engine for controlling the flow rate of the engine cooling water to assure its smooth circulation and to prevent the overheating of the engine and the deterioration of the oil by maintaining normal engine temperature to increase the durability of the engine.

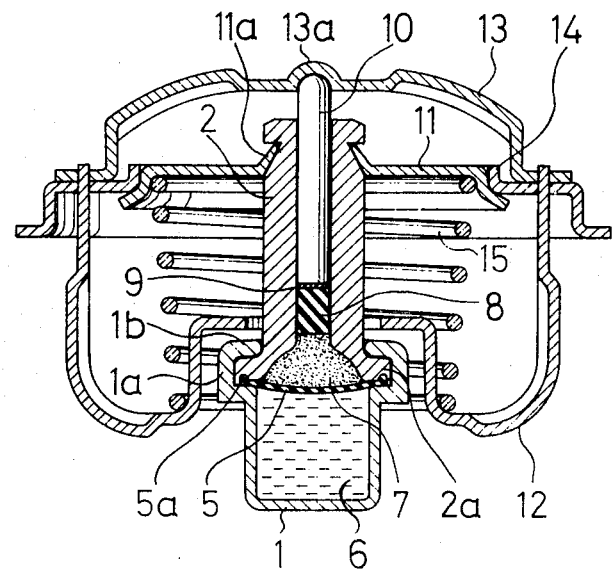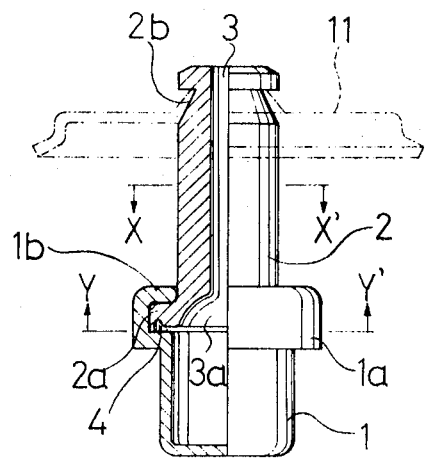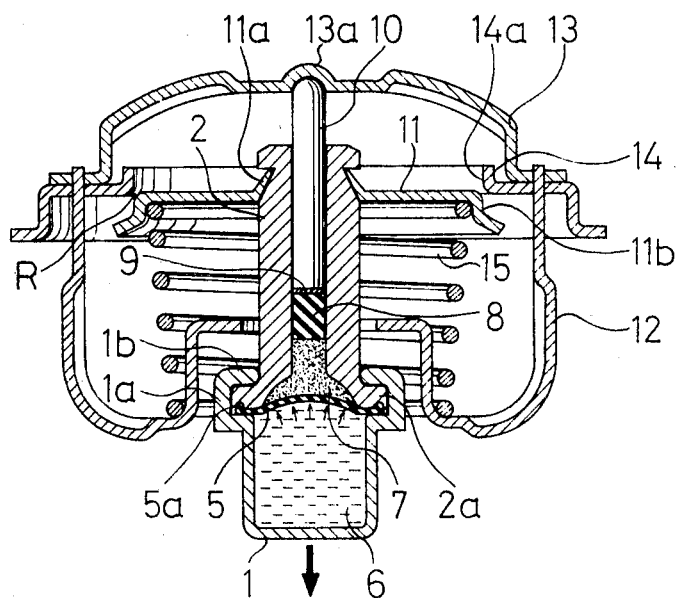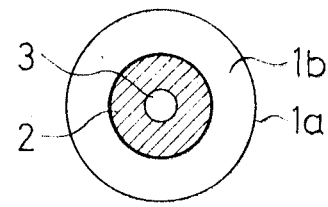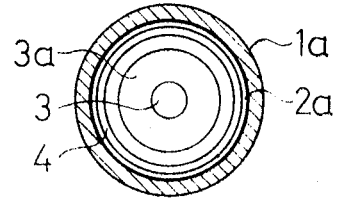

THERMOSTAT FOR ENGINE COOLING WATER

Although the fundamental object of the present invention is stated above, a new objective to be achieved by the improvement of this invention is to form the thermostat element in such a way that a heat expandable material and a piston mechanism which acts by the expansion pressure of said expandable material are contained in separately formed cases and a diaphragm consisting of a heat resistant flexible elastic body is placed between the contacting surfaces of said cases as a partition wall so as to prevent the leaking of the expandable material and also to effect a lifting action on the piston by way of the movement of the diaphragm.

The elements of this kind of thermostat generally consist of a piston and an elastic body inserted in a cylindrical guide in a heat conductive case filled with a heat expandable material, usually wax, and therefore, there is the possibility of a leak of the expandable material from the contact surface of the elastic body sliding in said guide and for an increase in friction resistance and fast wearing of the elastic body as it is subjected to direct heat and pressure by the thermal expansion of the expandable material, with the result that the functioning of the thermostat stops in a short time. In order to eliminate this defect of a conventional thermostat, the construction of the present invention is such that, as stated above, the expandable material and the piston mechanism are contained in separate cases which are integrately fitted together and the diaphragm is hermetically placed between the opposing surfaces of the said cases for allowing the expansion pressure of the expandable material to act on the piston by way of the diaphragm.

It is another object of this invention to assure the opening and closing of the valve by increasing the lift of the piston in comparison with the amplitude of the diaphragm and to increase the durability of the diaphragm. A means for achieving this objective, the lower part of the center hole of the guide case which is in contact with the diaphragm is formed as a widely open cup and this cup is filled with a semifluid material which can change its form and move freely and furthermore, the piston is inserted into the center hole with the elastic body between them.

Yet another object of this invention is to place a Teflon sheet between the aforementioned elastic body and piston in such a way that the bottom surface of the piston will not push into the elastic body so that the elastic material can be made more durable.

It is yet another object of the invention that, in placing the diaphragm between the opposing surfaces of the cases, an upright piece having the shape of the outer circumferential edge of the diaphragm is pressed and fixed into a ring-shaped groove provided in the lower surface of the guide case and then both cases are hermetically fitted together for preventing the deformation and cracking of the diaphragm and the leaking of the expandable material through the fixed part, instead of simply inserting a flat diaphragm in a vertical position.

It is still another object of the invention to increase the contact area of the outer circumferential surface of the valve disc and the inner circumferential surface of the valve seat therefor and to lessen the load on the valve mechanism by gradually opening and closing the valve depending on the difference in temperature between both surfaces, thus, preventing the occurrence of surging and hunting phenomena.

Further objects of the invention will be in part obvious and in part pointed out in the following description of the drawing, in which, FIG. 1 is a vertical section of the central part of the thermostat of this invention with the valve closed and illustrates an embodiment of the invention, FIG. 2 is also a vertical section of the central part of the thermostat with the valve open for allowing the passage of water, FIG. 3 is a side view partly in section illustrating the assembly of the heat conductive case and the guide case forming parts of the thermostat, and FIG. 4 and FIG. 5 are cross-sectional views taken along line X-X' and line Y'Y', respectively of FIG. 3.

The objects and advantages of the present invention will become apparent from the following description of the drawing.

In the FIGS. 1 is a cylindrical heat conductive case with C-shaped socket 1a at the top thereof and said case is filled with the heat expandable material 6. The heat expandable material 6 is generally wax or a mixture of wax and copper powder. Said expandable material shall hereinafter be called wax for convenience of description.

2 is a guide case for the piston 10 and has flange 2a at its lower end, neck 2b on its outer surface near its top, center bore 3 opening into bottom recess 3a which is in the shape of a cup, and a ring-shaped groove 4 in the bottom face of flange 2a adjacent the circumference thereof.

5 is a diaphragm consisting of a heat resistant rubber or other flexible elastic body and having an annular upright flange 5a. Said flange 5a is pressed and fixed into the aforementioned ring-shaped groove 4 in the bottom end of the guide case, and said diaphragm is fitted hermetically in the socket 1a of case 1, providing a seal and partition between the cases 1 and 2.

7 is a semifluid material consisting of a mixture of silicon grease and molybdenum disulfide filled into the recess 3a inside the guide case 2. This material 7 is completely shut off by the partition wall of the diaphragm 5 so that it will not mix with the wax 6, and its upper portion extends into the lower part of the bore 3.

8 is a rubber or other cylindrical elastic body inserted in the bore 3 so as to be able to slide therein. This elastic body is placed close to the upper portion of the aforementioned semifluid material 7, and the piston 10 is inserted into bore 3 from above with the Teflon sheet 9 placed between the upper end of said elastic body and the inner end of said piston with the upper end of the piston protruding outside of the guide case 2.

11 is a disc valve having its center hole flange 11a fastened into the neck 2b of the guide case 2, its outer circumferential surface 11b in contact with the inner circumferential surface 14a of a round hole in the valve seat 14. Said valve seat has an annular slot through which extends the upper edge of cup 12 of an open frame housing. Housing cover 13 also is an open frame and has an annular slot through which extends the upper edge of cup 12 with cover 13 seated on valve seat 14. The upper edge of cup 12 is bent over or welded to the edge of cover 13 fixedly retaining said cover and thus, valve seat 14 to cup 12. Piston 10 extends into the bulge 13a of the cover 13.

Coil spring 15 is mounted between the interior of cup 12 and the bottom of valve disc 11 tending to push said valve disc 11 shut against valve seal 14.

In FIG. 2, R represents the passage of water when the valve 11 is open as it is detached from the valve seat 14.

In the above-mentioned construction of this invention, the cases 1 and 2 each containing the wax 6 and the semifluid material 7 of the piston mechanism are placed together hermetically and integrately with the diaphragm 5 as the partition wall, and therefore, the wax 6 is completely sealed in the heat conductive case 1 and does not leak out of the case or mix with the semifluid material 7 shut off by the diaphragm 5 when the wax is heated.

When the case 1 transmits the heat of the cooling system water which has risen in temperature above a certain point by the heating of the engine, the case transmits the external heat to the wax 6. And when the wax 6 is heated and expands, the expansion pressure thereof caused by the increase in the volume of the wax is transmitted to the diaphragm. The diaphragm 5 which has received this pressure swells upward while suitably expanding and is bent to push up the semifluid material 7 thereabove. The semifluid material 7 is packed in the cup-shaped recess 3a at the lower part of the guide case in such a way that the upper part of said material 7 will reach the interior of the center bore 3. Since the piston 10 is inserted into the center bore 3 with the elastic body 8 and Teflon sheet 9 between them, the piston 10 is pushed up when the semifluid material moves up when pressed from below.

However, as the outer end of the piston 10 is immovable being fitted in the bulge 13a of the cover 13 of the housing, the guide case itself is subjected to a counterpressure against the force of the springs 15 positioned against the valve disc 11 and comes down, guided by the piston, with the result that the valve disc 11 opens by being detached from the valve seat 14 to allow the passage R for the cooling water. See FIG. 2.

Thus, the heat conductive case 1 transmits the external heat from the water which it has transmitted to the wax 6 and the pressure resulting from the increase in volume of the wax which is heated and expanded with this heat is transmitted to the diaphragm 5 to push up the piston 10. In this case, as the entire surface of the diaphragm is widely in contact with the semifluid material inside the cup-shaped recess 3a, the change in volume of the semifluid material is largely transmitted from the wide region of the cup-shaped recess 3a to the narrow region of the center bore 3 even by a small amplitude of the diaphragm, making the range of lift of the piston 10 correspondingly long. This range of lift controls the range of the lowering distance of the guide case which enables the valve disc 11 to open and close in a proper manner.

Furthermore, the valve disc 11 which opens as the guide case lowers has its outer circumferential surface 11b in contact with the inner circumferential surface 14a of the valve seat 14 and the area of said contact is large, so that it does not open completely at a time, but opens gradually as the piston is lifted by the difference of temperature. In this way the passage R is gradually opened. A sudden flowing of large quantities of water is thus prevented. Water always flows out smoothly in the desired quantities corresponding to the rise in temperature of the engine to cool it as required, and therefore no excessive load is applied on the valve disc, thus preventing the surging and hunting phenomena and assuring the durability of the thermostat.

Along with this advantage, the diaphragm 5 has increased durability being free from cracks and damages by deformation because it is fixed by the ring-shaped groove 4 and makes no strong reciprocating motion as its amplitude is small.

As the semifluid material 7, consisting chiefly of silicon grease and molybdenum disulfide, does not change its fluidity with a change of temperature and has an excellent lubricating action, it is capable of smoothly transmitting its change in volume even at a slight pressure of the diaphragm 5. As the elastic body 8 in the center bore 3 is pushed up vertically from below in the interior of the center bore, its sliding resistance is very small. All these features combine to make the piston 10 act smoothly in the wide lifting range to obtain the expected effect.

The Teflon sheet 9 placed between the elastic body 8 and the piston 10 has the effect to prevent the bottom surface of the piston from coming into the elastic body to interrupt its sliding action.

When the wax is cooled and decreases in volume as the temperature drops with the circulation of the cooling water, the valve disc 11 is pushed up by the force of the spring 15 to come in tight contact with the valve seat 14 and closed and then the diaphragm naturally returns to its original position as the piston returns into the center bore 3.

As is clear from the above detailed description, the present invention has remarkable advantages to exert novel effects and all objectives expected from this invention can be easily achieved by the improvement of each part composing the apparatus.

I claim:

1. An improvement in thermostats for engine cooling systems comprising an open frame housing, a heat conductive case, a heat expandable material in said case, a diaphragm positioned across the case and the material therein, a guide case having a longitudinal bore; a cup-shaped recess in one end opening into said bore and having said diaphragm extending across said recess, said recessed end of said guide case being attached to said heat conductive case, a semifluid material consisting of a mixture of silicon grease and molybdenum disulfide in said recess, an elastic body in said bore above said semifluid material, a plastic sheet on top of said elastic body in said bore, a piston slideably mounted in said bore with one end on said sheet and its opposite end outside said guide case bearing against said housing, a valve disc attached to said guide case, a valve seat carried by said housing capable of being closed by said valve disc, and a spring mounted between said valve disc and the interior of said housing.